No. 650,015. Patented May 22, 1900.
E. LAGRANGE & P. HOHO.
ELECTRIC WELDING.
(Application filed Aug. 15, 1892.)
(No Model.)
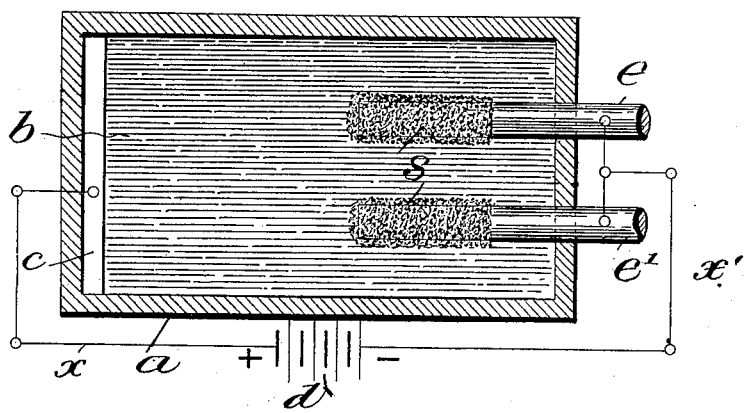
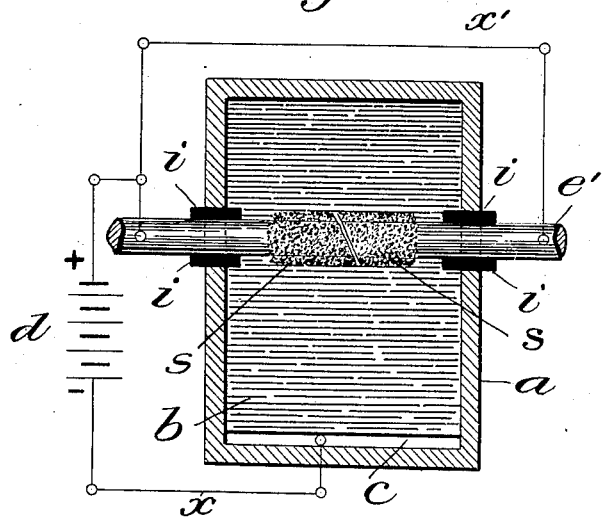
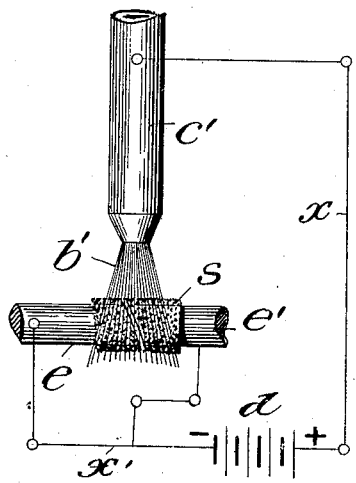
WITNESSES:
L. C. Hills
Walter Allen
INVENTORS
Eugène Lagrange,
Paul Hoho.
By Knight Bros.
Attorney

UNITED STATES PATENT OFFICE.

EUGENE LAGRANGE AND PAUL HOHO, OF BRUSSELS, BELGIUM.

ELECTRIC WELDING.

SPECIFICATION forming part of Letters Patent No. 650,015, dated May 22, 1900.

Application filed August 15, 1892. Serial No. 443,168. (No model.)

*To all whom it may concern:*

Be it known that we, EUGENE LAGRANGE, a subject of the King of Belgium, and PAUL HOHO, a subject of the Queen of the Netherlands, both residents of Brussels, in the Kingdom of Belgium, have invented a certain new and useful Improvement in Methods of Welding by Electricity, (for which we have obtained Letters Patent in Belgium No. 91,289, dated July 16, 1890, with an improvement dated May 4, 1892; in France, No. 210,028, dated July 10, 1891, with an improvement No. 208,391, dated May 12, 1892, and in Great Britain, No. 7,226, dated April 14, 1892,) of which the following is a specification.

Our invention relates to a new method of welding by heat obtained from an electrical current.

Our improvement consists in a method for electrically heating two or more bodies or pieces of metal for welding or similar purposes, which comprises the connecting together of bodies or pieces of metal as electrodes of the same sign, bringing them into contact with an appropriate uniformly-charged liquid or moist body, and then passing through the liquid to the bodies or pieces of metal an electric current sufficient to develop on the bodies or pieces of metal at the points of contact with the liquid a gaseous resistance, and developing at and near such resistance incandescence of the bodies or pieces of metal, as hereinafter described and claimed.

Our invention will be fully understood upon reference to the following description, in connection with the accompanying drawings, in which—

Figure 1 is a plan view of a receptacle and apparatus employed in connection with our improved method. Fig. 2 is a plan view of a receptacle and apparatus, showing a modification. Fig. 3 is an elevation showing the employment of a spray of liquid instead of a body thereof.

$a$ is a receptacle of any kind of insulating material—a case of wood, for example.

$b$ is a body of liquid contained in the receptacle $a$, or liquid $b'$ in the form of a spray or vapor brought into contact with the part of bodies or pieces of metal to be heated.

$c$ is an electrode of lead or other suitable metal or of any other conducting substance—such as carbon, for example. This electrode is connected by a conductor $x$ with a source of electricity $d$, which may be a dynamo, a primary or secondary battery, &c.

$e\ e'$ are two bodies or pieces of metal partly plunged in the liquid $b$ and connected to the same pole by conductor $x'$ with the source of electricity $d$.

The circuit being supposed to be closed, the figure shows the gaseous electrical sheaths $s$, which are seen to envelop the immersed surfaces of the pieces $e\ e'$.

An apparatus by which the process is applied to welding two bodies or pieces of metal $e\ e'$ is shown in Fig. 2, in which the parts to be heated are immersed in a conducting liquid, the two bars being also connected to the same pole. The parts of the bars to be welded are forced one against the other by manual pressure or by the aid of an appropriate machine.

Fig. 3 represents a case where the body of liquid is replaced by a jet or spray $b'$ of water or of steam issuing from a conducting-pipe $c'$ and localizing the calorific action on the bodies or pieces of metal $e\ e'$, the circuit being closed by $d\ x\ c'\ b'\ e\ e'\ x'\ d$. To localize the calorific action upon and in the solid body at the given point, the surface of contact with the liquid may be limited by enveloping the adjacent part at that point or covering it with a suitable insulator $i$. (See Fig. 2.)

Having thus described our invention, the following is what we claim as new therein and desire to secure by Letters Patent:

1. The method herein described for electrically heating two or more bodies or pieces of metal for welding and similar purposes, which consists in connecting both bodies or pieces of metal as electrodes of the same sign, bringing them into contact with an appropriate uniformly-charged liquid or moist body and then passing through the liquid to the bodies or pieces of metal, an electric current sufficient to develop on the bodies or pieces of metal at the points of contact with the liquid, a gaseous resistance and developing at and near such resistance, incandescence of the bodies, or pieces of metal as explained.

2. The method of heating two or more bodies for welding purposes which consists in connecting said bodies as electrodes of the same sign, bringing them into contact with a liquid capable of evolving hydrogen by electrolysis and then passing through the liquid to the bodies an electric current of sufficient tension to develop around the bodies at the points of contact with the liquid a gaseous resistance sheath.

E. LAGRANGE.
PAUL HOHO.

Witnesses:
EDMUND JULIAN,
OSCAR DAVID.